(No Model.) 2 Sheets—Sheet 1.
E. B. KEITH.
HAY LOADER.
No. 520,059. Patented May 22, 1894.
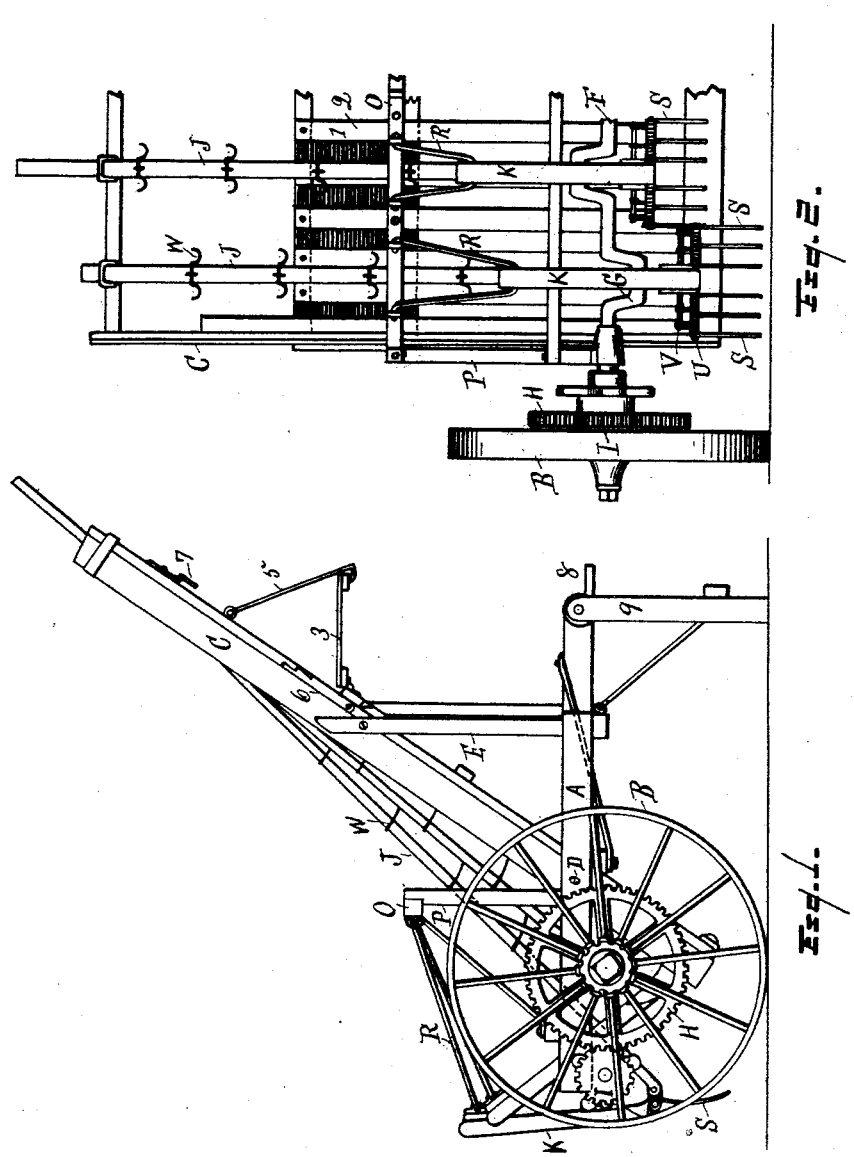
WITNESSES
S. E. Thomas
Levi F. Cox
INVENTOR
Ethan B. Keith,
By Lucius C. West.

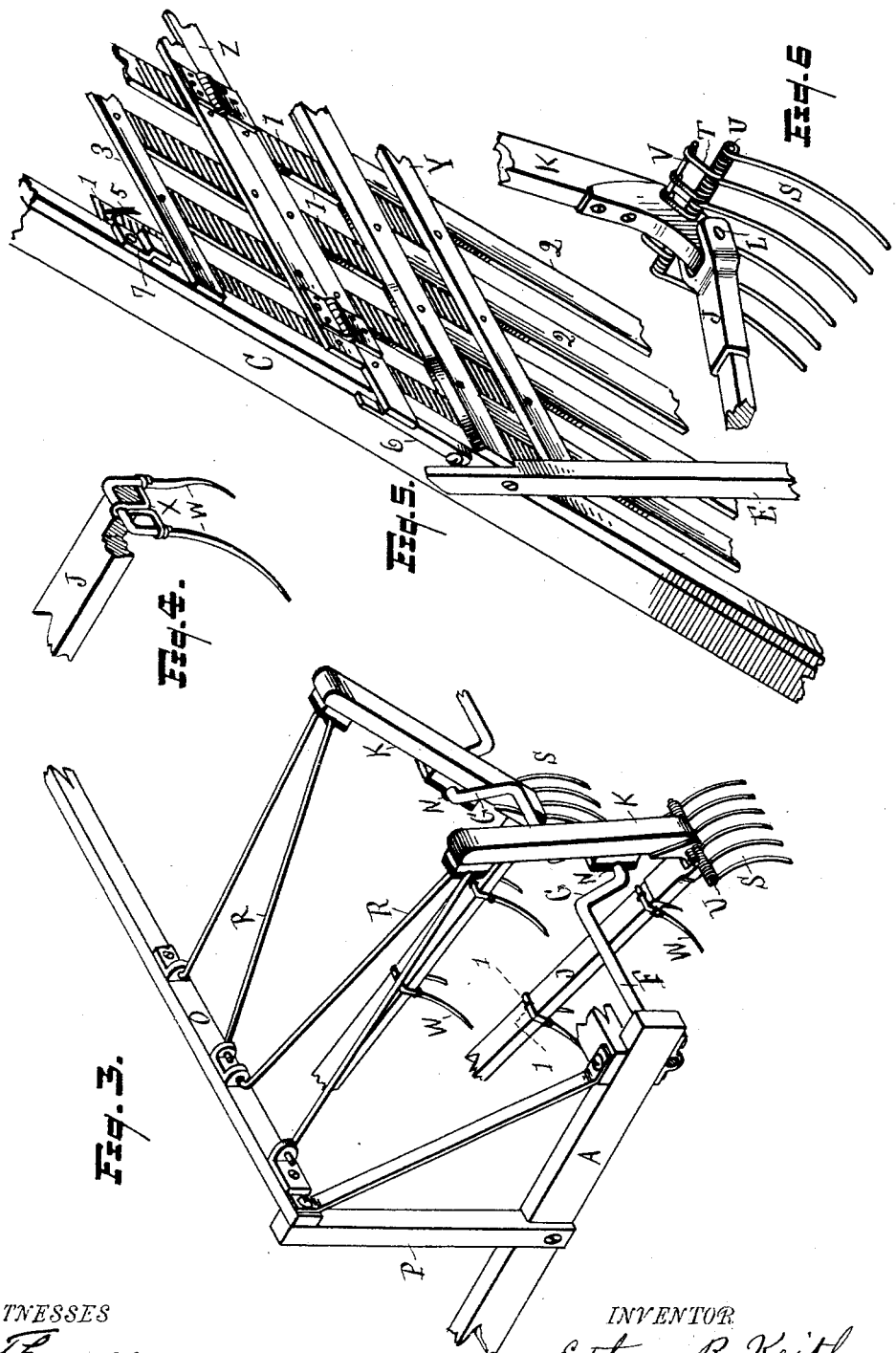

UNITED STATES PATENT OFFICE.

ETHAN B. KEITH, OF GALESBURG, ASSIGNOR OF ONE-HALF TO WILLIAM R. RITTER, OF DOWAGIAC, MICHIGAN.

HAY-LOADER.

SPECIFICATION forming part of Letters Patent No. 520,059, dated May 22, 1894.

Application filed February 10, 1894. Serial No. 499,801. (No model.)

*To all whom it may concern:*

Be it known that I, ETHAN B. KEITH, a citizen of the United States, residing at Galesburg, county of Kalamazoo, State of Michigan, have invented a new and useful Hay-Loader, of which the following is a specification.

This invention relates to that class of hay-loaders which employ alternately reciprocating toothed elevator bars and rakes, operated by a crank-shaft having a series of zigzag cranks, to gather and elevate the hay onto the load.

The invention has for its object important features in the construction of the gathering-rakes, and in the plan of operating and associating them with the toothed elevator-bars.

Another object consists in the mode of attaching the teeth to the elevator-bars.

Another object is to provide the floor of the elevator-rack with an extensible portion, and to provide said portion with a hinged adjustable platform, so that the height of elevating the hay may be governed in accordance with the increasing height of the load.

These and other objects will be more fully set forth below, and the peculiar advantages thereof clearly described.

In the drawings forming a part of this specification, Figure 1, is a side elevation; Fig. 2, a broken front view looking from a point at the left of Fig. 1; Fig. 3, an enlarged perspective of parts in Fig. 2; Fig. 4, an enlarged section on line 1—1 in Fig. 3; Fig. 5, an enlarged rear view of broken details from Figs. 1, and 2, in perspective, and Fig. 6, shows an enlarged perspective view of one of the gathering rakes in Fig. 3.

Referring to the letters and figures of reference on the drawings, A is the base frame supported by the wheels B, Figs. 1, and 3. The elevator rack C, at an incline, Figs. 1, 2, and 5, is attached to the base frame B, at D, and is braced by uprights or standards E. The crank-shaft F, having a series of zigzag cranks G, has bearings at each end in the base-frame A, and is driven by the gears H, and I. The gear I, is of course in use provided with some arrangement for throwing the crank-shaft in and out of gear. Any well known clutch or the like may be employed for the purpose.

The reciprocating elevator-bars J, it will be noticed are not attached directly to the cranks G, but are pivotally attached at the lower end to the lower end of the short rake handles K, at L, Fig. 6, which rake handles are pivotally attached between their two ends to the cranks G, at N.

A cross-bar O, is supported above the elevator-rack C, and base-frame A, by standards P, which standards are attached to said base-frame, Figs. 1, 2, and 3. To the cross-bar O, and to the upper end of the rake handles K, are pivotally connected at each end, rods R, Figs. 1, 2, and 3, which rods form a fulcrum to the rake handles, and assist in establishing and controlling the peculiar sweep made by the rakes during the operation of gathering and loading the hay.

The principal advantage in the peculiar sweep of the gathering-rakes S, is that instead of describing a circle as heretofore, (in which case they do not rake as clean) they describe an oblong or somewhat egg shaped path, but flattened or nearly straight on the under side near the surface of the ground, thus moving a greater distance near to the ground, after they have entered the hay with their teeth tilted to the front as they start on their backward movement, by which means the hay is delivered to the elevator teeth W, in a manner less liable to become entangled with the gathering-rakes. The tilt of the teeth of the gathering-rakes S, is also partially controlled by their peculiar construction and attachment to the rake handles K. These rake teeth are provided with an elastic coil near the top, and with an end T, extending above the coil and terminating in an eye, Fig. 6. A rod U, is passed through the elastic coil, and through the lower end of the rake handle K, just above the pivot L and another rod V, is passed through the eye of the end T, and through the rake handle K, at a point a little above the rod U. Thus the elastic coil and the eye are pivotally attached to the rods U, V, the rod U, forming a fulcrum on which the rake teeth tilt when the rake handle K, swings on the fulcrum N, during the operation. It will be noticed that the teeth of the rakes S, are independent of each other and easily detachable. As many of the teeth may be employed in a single rake as desirable.

The teeth W, of the elevator-bars J, are made by bending in something the shape of an inverted letter U, and placed astride of the bars, Fig. 4. They are secured by a tie-wire X, bent upon itself, placed astride of the loop of the teeth W, and the ends passed down through a hole in the bar J, and from thence bent laterally each way on the under side of the bar, and wound around the side prongs of the teeth. This is a strong and convenient manner of securing the teeth, and they can be readily detached and replaced with new ones should they become broken or unduly bent.

The extensible part of the floor of the elevator-rack C, consists of cross pieces Y, Z, and slats 1, which slats 1, slide between the slats 2, of the floor of the main part of the elevator-rack, Fig. 5. This extensible part further consists of the adjustable platform 3, hinged to the cross piece Z. The object of this is to deliver the hay onto the load at a point lower down when the load is first commenced, and to raise the extensible part as the load increases in height, thus obviating the necessity of elevating all the hay to the top of the elevator.

In Fig. 1, the platform 3, is swung down to a horizontal position, and is held by a hooked rod 5, one on each side, which rod is attached to an extended end of the side cleats 1, Fig. 5. The rod 5, is shown broken in Fig. 5. This platform 3, prevents any hay from falling between the rack and the load. As the load grows higher the extensible part is raised and held by the extended ends of the cross piece Z, resting on one of the notches of the dogs 6, which dogs are attached to the sides of the elevator-rack C, Figs. 1, and 5. When the load becomes high enough to allow the hay to pass over the upper end of the elevator-rack C, the platform 3, of the extensible part, is closed, and its upper end caught under the lugs 7, attached to the sides of the elevator-rack, and its cross piece Z, allowed to rest on the upper notch of the dogs 6.

It will be understood of course that Figs. 2, 3, and 5, illustrate one side of the machine, and that the other side in the complete device is a duplicate thereof.

When in use, the hay loader is attached to the rear of the wagon, (not here shown) connection being made with the base frame at 8. In Fig. 1, is shown at 9, a rest to support the end of the base frame A, when detached from the wagon.

Having thus described my invention, what I claim as new, and desire to secure by Letters Patent of the United States, is—

1. In a hay loader, the combination, of the base frame, the transverse bar supported above said frame, the crank-shaft, toothed reciprocating elevator-bars, gathering-rakes provided with short handles, said handles being pivotally attached between their two ends to the cranks of the crank-shaft, the lower end of said rake-handles being pivoted to the lower end of the toothed elevator-bars, and rods pivotally attached at one end to said transverse bars, and at the other end to the upper end of the rake handles, substantially as set forth.

2. In a hay loader, the combination, of the base-frame, the transverse bar supported above said frame, the crank-shaft, toothed reciprocating elevator-bars, the gathering rake handles pivotally attached between their two ends to the cranks of the crank-shaft, the lower end of said rake handles being pivoted to the lower end of the toothed elevator-bars, rods pivotally attached at one end to said transverse bar, and at the other end to the upper end of the rake handles, and rake teeth provided with the elastic coil, and with the eyed end above said coil, said coil and eyed-end being pivotally attached to the lower end of the rake handles at a point just above the pivotal attachment of said handles with the toothed elevator-bars, substantially as set forth.

3. In a hay loader, the elevator-bars, provided with the inverted U-teeth astride of said bars, and the tie-wires passed over the bow of the teeth, down through the bars, thence bent laterally each way on the under side of the bars, and attached to the sides of the teeth, substantially as set forth.

4. In a hay loader, the gathering-rakes, comprising a handle, and the teeth provided with the elastic coil and the eyed-end above said coil, said coil and eyed-end being pivotally and detachably attached to the handle, by rods which project laterally from the sides thereof, and loosely pass through said eyes and coils substantially as set forth.

5. In a hay loader and the like, an elevator rack in combination with the extensible part to the floor said part comprising the main portion having a sliding connection with the elevator-rack, and the adjustable platform hinged to said main portion, substantially as set forth.

6. In a hay loader and the like, an elevator-rack, in combination with the extensible part to the floor, said part comprising the main portion having a sliding connection with the elevator-rack, the adjustable platform hinged to said main portion, the pivoted notched dogs for holding up said extensible part, and the hooked rods for holding the platform in its down position, substantially as set forth.

In testimony of the foregoing I have hereunto subscribed my name in the presence of two witnesses.

ETHAN B. KEITH.

Witnesses:
LEVI F. COX,
WILLIAM R. RITTER.